United States Patent
Revah et al.

(10) Patent No.: US 8,805,902 B2
(45) Date of Patent: *Aug. 12, 2014

(54) MANAGING SNAPSHOT STORAGE POOLS

(71) Applicant: International Business Machines Corporation, Armonk, NY (US)

(72) Inventors: Yaron Revah, Tel Aviv (IL); Shemer Schwartz, Tel Aviv (IL); Efri Zeidner, Kiryat Mozkin (IL); Ofir Zohar, Alfe Menashe (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/626,208

(22) Filed: Sep. 25, 2012

(65) Prior Publication Data

US 2013/0036281 A1    Feb. 7, 2013

Related U.S. Application Data

(63) Continuation of application No. 13/250,517, filed on Sep. 30, 2011, now Pat. No. 8,301,670, which is a continuation of application No. 11/485,775, filed on Jul. 13, 2006, now Pat. No. 8,069,191.

(51) Int. Cl.
  *G06F 17/30* (2006.01)
(52) U.S. Cl.
  USPC ............ 707/823; 711/154; 711/112; 711/151
(58) Field of Classification Search
  None
  See application file for complete search history.

(56) References Cited

U.S. PATENT DOCUMENTS

| | | | |
|---|---|---|---|
| 5,682,195 A | 10/1997 | Hendricks et al. | |
| 7,028,158 B1* | 4/2006 | Beatty et al. | 711/202 |
| 7,103,731 B2 | 9/2006 | Gibble et al. | |
| 7,225,208 B2 | 5/2007 | Midgley et al. | |
| 7,243,094 B2 | 7/2007 | Tabellion et al. | |
| 7,249,179 B1 | 7/2007 | Romero et al. | |
| 7,937,421 B2* | 5/2011 | Mikesell et al. | 707/825 |
| 2003/0220948 A1 | 11/2003 | Green et al. | |
| 2003/0220951 A1* | 11/2003 | Muthulingam et al. | 707/205 |
| 2004/0044827 A1 | 3/2004 | Carlson et al. | |
| 2004/0044855 A1* | 3/2004 | Carlson et al. | 711/154 |
| 2004/0098383 A1* | 5/2004 | Tabellion et al. | 707/3 |
| 2005/0055603 A1 | 3/2005 | Soran et al. | |
| 2005/0246401 A1 | 11/2005 | Edwards et al. | |
| 2006/0069861 A1* | 3/2006 | Amano | 711/114 |
| 2006/0282485 A1 | 12/2006 | Aggarwal et al. | |
| 2007/0168634 A1* | 7/2007 | Morishita et al. | 711/170 |
| 2008/0209104 A1* | 8/2008 | Tanaka et al. | 711/100 |

* cited by examiner

*Primary Examiner* — Anh Tai Tran
(74) *Attorney, Agent, or Firm* — Griffiths & Seaton PLLC

(57) ABSTRACT

Various embodiments of the invention relate to an apparatus and a method of managing a snapshot storage pool (SSP) associated with a storage unit of a distributed data storage system. One apparatus includes a logic module and a processor. The logic module is adapted to provide a threshold corresponding to a ratio between a current amount of storage resources used for storing snapshots in the SSP and a total storage capacity defined for the SSP. The processor is adapted to trigger an action that may be effective for managing the SSP in response to the amount of storage resources used for storing snapshots in the SSP crossing the threshold.

20 Claims, 2 Drawing Sheets

MANAGING SNAPSHOT STORAGE POOLS

REFERENCE TO RELATED APPLICATIONS

This Application is a Continuation of U.S. patent application Ser. No. 13/250,517, filed on Sep. 30, 2011, which is a Continuation of U.S. patent application Ser. No. 11/485,775, now U.S. Pat. No. 8,069,191, filed on Jul. 13, 2006, each of which is incorporated herein by reference.

FIELD OF THE INVENTION

This invention relates to the management of snapshot storage pools.

BACKGROUND OF THE INVENTION

In data storage systems it is desirable to enable internal copies of existing logical data units (LUs) for purposes of backup, possible restore in case of future data corruption, testing, etc. An early solution suggested copying entire LUs or "volumes," so that two (or more) copies of the LU coexisted simultaneously in the system. In accordance with this approach, only the original LU is gradually modified as part of the operation of the storage system, whereas the copy is not modified, so that the state of the LU at the instant of establishing the copy could be restored. This approach requires that all the data in the original LU that has not been modified is kept twice in the system. Usually this duplicate data takes up large amounts of storage space. Moreover, implementing this approach involves a considerable investment of CPU resources that are required to enable copying all the data from the source to the target.

As a development of the above technique, the use of snapshots has been suggested. A snapshot is usually implemented by using markers or pointers. The snapshot is a virtual copy of a storage unit as it existed at the time of establishing the snapshot. In accordance with one implementation of snapshots known as "copy-on-write," snapshots are characterized by the ability to maintain a single copy of source data that has not been modified, whereas, for modified data, two portions of data are kept: one for the original data being part of the snapshot and a second for the modified data. In accordance with one implementation of snapshots, unmodified data is associated with two pointers, one for the source storage unit and one for the snapshot, whereas for data that was modified, a pointer to the original data is added to the snapshot and the same pointer may be replaced at the source storage unit with a pointer to the modified data.

For storing the data created as part of the snapshot process, storage resources on a physical storage device, such as a disk, are allocated, typically in advance. Since data storage systems are dynamic, with time, the amount of data that needs to be stored as part of the snapshot activity accumulates, and increasing amounts of storage resources are used for storing the data. This and more, in many data storage systems where several volumes exist, typically for each volume several snapshots are created and the amount of data that needs to be stored grows with each snapshot. If too little storage resources are allocated for storing data as part of the snapshot activity, there is a risk of depleting the storage resources very quickly. On the other hand, if large amounts of storage resources are allocated for the storage activity, a snapshot solution becomes less attractive and less efficient, because you the amount of space being saved spared is less significant.

It has been suggested to create groups of volumes for which a shared pool of storage resources will be allocated for storing data associated with snapshots established on each volume group. Such a pool of storage resources that are allocated for storing data associated with snapshots established on a volume group is known as "a snapshot pool."

Current storage snapshot methodologies and corresponding equipment do not suggest managing a snapshot storage pool, particularly by enabling an action that is effective for managing the snapshot storage pool based upon a predefined criterion corresponding to a ratio between a current amount of storage used for storing snapshots in the pool and a total storage capacity defined for the pool.

SUMMARY OF THE INVENTION

Some embodiments of the invention relate to an apparatus and a method of managing a snapshot storage pool (SSP) associated with a storage unit of a distributed data storage system. According to some embodiments of the invention, the apparatus may include a logic module and a controller. The logic module may be adapted adapted to provide a threshold corresponding to a ratio between a current amount of storage resources used for storing snapshots in the SSP and a total storage capacity defined for the SSP. The controller may be adapted to trigger an action that may be effective for managing the SSP in response to the amount of storage resources used for storing snapshots in the SSP crossing the threshold.

According to further embodiments of the invention, in response to the amount of storage resources used for storing snapshots in the SSP crossing the threshold, the controller may be adapted to select the action to be triggered from a group consisting of: deleting data corresponding to one or more snapshots from the SSP; reallocating additional storage resources from a reserve storage pool of the data storage system to the SSP; and transferring storage resources from a second snapshot storage pool to the SSP.

According to further embodiments of the invention, a method of managing a snapshot storage pool (SSP) associated with two or more storage units of a distributed data storage system may be provided. According to some embodiments of the invention, the method may include providing a threshold corresponding to a ratio between a current amount of storage resources used for storing snapshots in the SSP and a total storage capacity defined for the SSP, and associating an action effective for managing the SSP with the threshold, such that the threshold is effective for triggering the action in response to the current amount of storage resources used for storing snapshots in the pool crossing the threshold.

According to some embodiments of the invention, the method may further include selecting the action to be triggered in response to the current amount of storage resources used for storing snapshots in the pool crossing the threshold from a group consisting of: deleting data corresponding to one or more snapshots from the SSP; reallocating additional storage resources from a reserve storage pool of the data storage system to the SSP; and transferring storage resources from a second snapshot storage pool to the SSP.

According to still further embodiments of the invention, a computer program product comprising a computer useable medium having computer readable program code embodied therein of managing a snapshot storage pool (SSP) associated with two or more storage units of a distributed data storage system, may be provided. According to some embodiments of the invention, the computer program product may include a computer readable program code for causing the computer to provide a threshold corresponding to a ratio between a current amount of storage resources used for storing snapshots in the SSP and a total storage capacity defined for the SSP, and a computer readable program code for causing the computer to associate an action effective for managing the SSP with the threshold, such that the threshold is effective for triggering the action in response to the current amount of storage resources used for storing snapshots in the pool crossing the threshold.

According to some embodiments of the invention, the computer program product may further include computer readable program code for causing the computer to select the action from a group consisting of: deleting data corresponding to one or more snapshots from the SSP; reallocating additional storage resources from a reserve storage pool of the data storage system to the SSP; and transferring storage resources from a second snapshot storage pool to the SSP.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
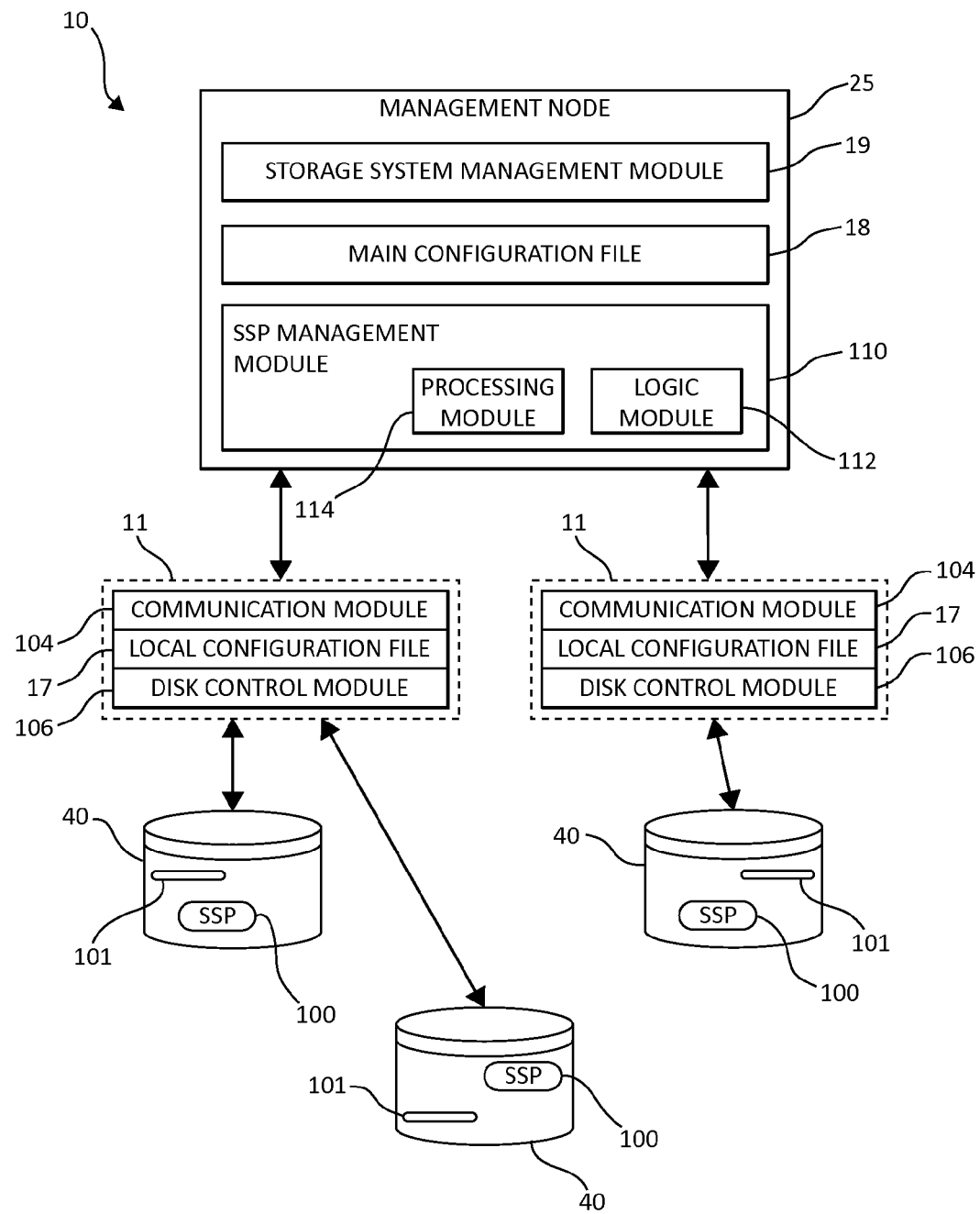
FIG. 1 is a block diagram illustration of an apparatus for managing a snapshot storage pool (SSP) and associated elements of a distributed storage system, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing," "computing," "calculating," "determining," "generating," "assigning," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "storage unit" is used to describe a unit of storage space within a data storage system for which a snapshot storage pool may be defined. A storage unit may correspond to one or a group of physical storage devices, such as a disk, or a storage unit may correspond to a virtual unit of storage space defined and operated over physical data storage devices. Each virtual storage unit may be defined over one or more than one physical data storage devices, and may be defined over whole storage devices or over portions of storage devices and any combination thereof. It would be appreciated that a storage unit as used herein may include, but is not limited to: one or a group of two or more logical units (LU) (for example, in a storage area network (SAN) system), one or a group of two or more files of a file system (for example, in a network-attached storage (NAS) system), etc.

Turning now to FIG. 1, there is shown a block diagram illustration of an apparatus for managing a snapshot storage pool (SSP) and associated elements of a distributed storage system, according to some embodiments of the invention. In FIG. 1 and according to some embodiments of the invention, a SSP management module 110 is implemented as part of a management node 25 of a distributed storage system 10. According to further embodiments of the invention, the SSP management module 110 is in communication with permanent storage devices 40. According to some embodiments of the invention, the SSP management module 110 is operatively connected to the permanent storage devices 40 through one or more disk controllers 106. In FIG. 1 and according to some embodiments of the invention, the SSP 100 is distributed over the permanent storage devices 40. Further details with respect to the portion of the distributed storage system 10 shown in FIG. 1 shall be provided below.

According to some embodiments of the invention, the SSP management module 110 is adapted to manage the SSP 100. According to some embodiments of the invention, the SSP management module 110 may include a logic module 112 and a processing module 114. According to some embodiments of the invention, the logic module 112 may be adapted to provide a threshold corresponding to a ratio between a current amount of storage resources used for storing snapshots in the SSP 100 and a total storage capacity defined for the SSP 100, and the processing module 114 may be adapted to trigger an action that is effective for managing the SSP 100 in response to the amount of storage resources used for storing snapshots in the pool 100 crossing the threshold. According to some embodiments of the invention, the processing module 114 may be adapted to trigger a predefined action in connection with a certain threshold. According to further embodiments of the invention, the processing module 114 may be adapted to trigger a plurality of predefined actions and each of the predefined actions may be associated with a different threshold, as will be described in further detail below.

In accordance with some embodiments of the present invention, the threshold corresponding to a ratio between a current amount of storage resources used for storing snapshots in the SSP 100 and a total storage capacity defined for the SSP 100 may be representative of a situation of near-depletion of the storage resources allocated for the SSP 100. Thus, for example, according to some embodiments of the invention, the action (that is effective for managing the SSP 100) may be triggered when the storage resources associated with the SSP 100 are nearing depletion. An example of a process according to some embodiments of the invention whereby resources of the portion of the storage system 10 shown in FIG. 1 are utilized in a manner to enable the SSP management module 110 to implement the threshold with respect to the ratio between a current amount of storage resources used for storing snapshots in the SSP 100 and a total storage capacity defined for the SSP 100 and further in a manner to trigger an action that is effective for managing the SSP 100 in response to the amount of storage resources used for storing snapshots in the pool 100 crossing the threshold.

According to some embodiments of the invention, the predefined action may include a deletion of data corresponding to an existing snapshot or snapshots from the SSP 100. According to some embodiments of the invention, by deleting data corresponding to existing snapshots from the SSP 100, the amount of storage resources used for storing snapshots in the SSP 100 may be reduced. It would be appreciated that according to some embodiments of the invention, the deletion of data corresponding to existing snapshots from the SSP 100 may enable continued snapshots establishment and generation, where otherwise, additional snapshots would not have been allowed, for example, due to exhaustion of storage resources defined for the SSP 100. However, further embodiments of the present invention may not be limited to any particular motivation.

According to further embodiments of the invention, the logic module 112 may include a criterion\a to be used by the processing module 114 for determining which data to delete when the threshold is crossed. The criterion\a may relate to the amount of data to be deleted and may also relate to characteristics of the data to be deleted and/or to characteristics of the snapshot(s) whose corresponding data is to be deleted. Thus, based upon the criterion\a the processing module 114 may determine which data to delete once the action is triggered. Examples of criteria for determining which data to delete may include, but are not limited to, data corresponding to a predefined number of least-recently established snapshot(s), data corresponding to a predefined number of most-recently established snapshot(s), data corresponding to a pre-determined number of snapshots that are associated with the greatest amount of used storage resources (and subsequently, whose storage requires the greatest amount of storage resources), data corresponding to a predetermined number of snapshots that are associated with the least amount of used storage resources, data corresponding to a predefined number of snapshots that are associated with data that is being most frequently addressed with I/O requests, data corresponding to a predefined number of snapshots that are associated with data that is being least frequently addressed with I/O requests, etc. It would be appreciated that, according to some embodiments of the invention, intelligent threshold selection may contribute to a significant reduction in the likelihood of the storage resources defined for the SSP 100 becoming depleted. It would be further appreciated that, according to some embodiments of the invention, an intelligent data deletion strategy for managing the deletion data corresponding to snapshots from the SSP 100 (as may be embodied in the criterion\a used for determining which snapshot-associated data to delete) may reduce the likelihood of more important data being lost.

According to further embodiments of the invention, the predefined action may include a reallocation of additional storage resources from a reserve storage pool 101 of the data storage system 10 to the SSP 100. By allocating additional storage resources to the SSP 100, the total amount of storage resources defined for the SSP 100 is increased. The reserve storage pool 101 may include, for example, storage resources allocated to a failure recovery storage pool. A failure recovery storage pool may be, for example, a pool of storage resources allocated and reserved by a storage system for use in case of a failure of a storage element (e.g. a disk), as part of a recovery process. According to some embodiments of the present invention, the logic module 112 may include a criterion\a to be used by the processing module 114 for determining the amount of storage resources to be allocated for the SSP 100, once the processing module 114 determines that additional storage resources need to be allocated to the SSP 100 from the reserve storage pool 101. Alternatively, the logic module 112 may include data with respect to a fixed amount of storage resources to be allocated whenever the threshold is crossed, and the processing module 114 may be configured to allocate the additional fixed amount of storage resources whenever the corresponding action is triggered.

According to still further embodiments of the invention, the predefined action may include transferring storage resources previously associated with a second SSP (not shown in FIG. 1) to the SSP 100. A distributed data storage system in which more than one SSP is provided, shall be discussed in greater detail below with reference to FIG. 2. The logic module 112 may include a criterion\a to be used by the processing module 114 for determining from which SSP to take the additional storage resources. For example, in accordance with a criterion provided by the logic module 112, once the action is triggered, the processing module 114 may be configured to cause certain storage resources to be disassociated from a second SSP.

According to some embodiments of the invention, the SSP from which the storage resources are to be taken may be selected in accordance with one or more of the following criteria: the SSP associated the largest amount of unused storage resources; the SSP associated with the smallest amount of unused storage resources; the SSP associated with the least-recently established snapshot(s); the SSP associated with the most-recently established snapshot(s). According to some embodiments of the invention, the storage resources from the second SSP (the transferring SSP) may be re-associated with and made available to the (receiving) SSP 100. According to further embodiments of the invention, other criterion\a may also be used in addition to the above criterion or as an alternative.

According to some embodiments of the invention, the logic module 112 may also include criterion\a to be used by the processing module 114 for determining what amount of storage resources to transfer. For example, in accordance with a criterion provided by the logic module 112, once the action is triggered, the processing module 114 may be configured to cause a predefined amount of storage resources to be transferred from a second SSP to the SSP 100. In accordance with another example, the amount of storage resources to be transferred may be determined in accordance with the amount of unused storage resources associated with the other SSP, for example, in accordance with the amount of unused storage resources in the SSP from which storage resources are to be taken as determined in accordance with a predefined criterion. It should be appreciated that in accordance with some embodiments of the invention, the processing module 114 may be adapted to take the storage resources to be transferred to the SSP 100 from several (other) SSPs. The processing module 114 may be adapted to determine from which SSPs to take the storage resources, for example, in accordance with any one or more of the above mentioned criteria, with the necessary modification to accommodate for the selection of a plurality of SSPs. The processing module 114 may be configured to take a certain fixed amount of storage resources from each of the SSPs, or in accordance with further embodiments of the invention, the processing module may take a different amount of storage resources from each of the SSPs, for example, based on the amount of storage resources used by the SSP.

The logic module 112 may be configured to provide a single threshold or it may be configured to provide more than one threshold. According to some embodiments of the invention, in case more than one threshold is provided by the logic module 112, each threshold may be associated with a different action, for example, each threshold may be associated with a different one of the actions discussed above. According to further embodiments of the invention, in case more than one threshold is provided by the logic module 112, two or more thresholds may be associated with different action parameters with respect to the same action (for example, one of the actions discussed above). Thus, for example, in accordance with some embodiments of the invention, the logic module 112 may provide a first threshold associated with a relatively low amount of used storage resources relative to the total storage capacity defined for the SSP 100 (low ratio), and a second threshold associated with a high amount of used storage resources relative to the total storage capacity defined for the SSP 100 (high ratio). For the low ratio threshold the logic module 112 may provide action parameters that are effective to cause the processing module 114 to delete from the SSP 100 data corresponding to a relatively small number of snapshots when the low ratio threshold is crossed, for example, one snapshot, whereas for the high ratio threshold the logic module 112 may provide action parameters that are effective to cause the processing module 114 to delete data corresponding to a relatively large number of snapshots when the high ratio threshold is crossed, for example, three snapshots.

According to some embodiments of the invention, the processing module 114 may be adapted to determine the ratio between the current amount of storage resources used for storing snapshots in the SSP 100 and the total storage capacity defined for the SSP 100, as part of determining whether the ratio crossed a threshold and an associated action should be triggered, in response to receiving an indication that a snapshot is about to be established. However, according to further embodiments of the invention, the calculation of the ratio and the decision whether or not to trigger an action with respect to the SSP 100 may be responsive to any other events in the data storage system 10. According to yet further embodiments of the invention, the processing module 114 may be configured to periodically perform the calculation of the ratio and subsequently to decide whether to trigger an action or not. For example, the processing module 114 may be configured to check the ratio between current amount of storage resources used for storing snapshots in the SSP 100 and the total storage capacity defined for the SSP 100 at predefined times or after predefined intervals. According to some embodiments of the invention, the time instances at which the processing module 114 is configured to check the ratio may be adjusted from time to time, for example, based upon changes in system performance parameters or based upon any other relevant parameters.

As mentioned above, in FIG. 1, and according to some embodiments of the invention, the SSP management module 110 may be implemented as part of a management node 25 of the distributed data storage system 10. The management node 25 may be adapted to manage the storage resources of the distributed data storage system 10. According to some embodiments of the invention, the management node 25 may be adapted to define storage units that are to be used for storing data in the distributed data storage system 10. As part of defining the storage units, the management node 25 may be configured to determine the relationship between the storage units and the data storage devices 40 of the data storage system 10. According to further embodiments of the invention, the management node 25 may be adapted to define virtual data storage units over the physical data storage devices 40.

According to some embodiments of the invention, the management node 25 may include a storage system management module 19 and a main configuration file 18. The storage system management module 19 may be adapted to provide a configuration of the data storage system 10. Specifically, the storage system management module 19 may be adapted to define storage units within the data storage system 10 and to manage the storage units. The data with respect to the configuration of the data storage system 10 may be kept on the main configuration file 18 stored on or otherwise associated with the management node 25. The storage system management module 19 may be adapted to define data storage units over the physical data storage devices 40. According to some embodiments of the invention, a storage unit may be defined over one or more than one physical data storage devices 40. According to further embodiments of the invention, a storage unit may be defined over whole storage devices 40 or over portions of storage devices 40 and any combination thereof. The storage system management module 19 may include the necessary logic to enable it to determine the relationship between the storage units and the data storage devices 40 of the data storage system 10 and to manage this relationship. The data with respect to the relationship between the storage devices 40 and the storage units may be kept on the main configuration file 18. It would be appreciated that a storage unit as used herein may include, but is not limited to, a logical unit (LU) (for example, in a storage area network (SAN) system), a file of a file system (for example, in a network-attached storage (NAS) system), and other known in the present or yet to be devised in the future storage unit compatible with the teachings of the present invention.

The storage system management module 19 may be adapted to modify the relationship between the storage units and the data storage devices 40 of the data storage system 10. According to some embodiments of the invention the storage system management module 19 may be adapted to modify the relationship between the storage units and the data storage devices 40 of the data storage system 10 based upon predefined management rules, such as for example, in response to a request from the SSP management module 110 and in accordance with such a request, as is further discussed herein. As part of any modification, the storage system management module 19 may be adapted to update the data in the configuration file 18 in accordance with the modified configuration.

As mentioned above, in FIG. 1 and according to some embodiments of the invention, the SSP 100 may be distributed over the permanent storage devices 40. According to some embodiments of the invention, the storage system management module 19, either alone or in cooperation with the SSP management module 110, may provide storage resources on the storage devices 40 on which data corresponding to snapshots associated with the SSP 100 may be stored. According to some embodiments of the invention, the storage system management module 19 may allocate, for example, in cooperation with the storage system management module 19, storage resources on the data storage devices 40 for the SSP 100. According to further embodiments of the invention, the storage resources allocated for the SSP 100 may be registered in the main configuration file 18. Thus, changes made with respect to the storage resource allocated for the SSP 100 may be reflected in the main configuration file 18 and the main configuration file 18 may be modified accordingly.

A SSP 100 may be defined on a single data storage device 40 or across a plurality (two or more) of storage devices 40, and the SSP 100 may be associated with several areas on or portions of a storage device or storage devices 40. According to some embodiments of the invention, a SSP 100 may be defined for a (virtual) storage unit or for a group of storage units (two or more) in the system 10. The storage resource allocated for and associated with each SSP 100 may be registered, for example, in the main configuration file 18. In case the SSP 100 is distributed over a plurality of data storage devices 40 the main configuration file 18 may include data with respect to the storage resources on each of the data storage devices 40 that have been allocated for the SSP 100. According to some embodiments of the invention, whenever it is determined that certain changes are to be made with respect to the storage resources allocated for a SSP 100, the main configuration file 18 may be modified accordingly. According to further embodiments of the invention, changes with respect to the storage resources allocated for a SSP 100 are implemented by modifying the main configuration file 18 in accordance with the desired changes.

As mentioned above, according to some embodiments of the invention, the SSP management module 110 may be adapted to provide a threshold corresponding to a ratio between a current amount of storage resources used for storing snapshots in the SSP 100 and a total storage capacity defined for the SSP 100, and may be adapted to trigger an action that is effective for managing the SSP 100 in response to the amount of storage resources used for storing snapshots in the pool 100 crossing the threshold. According to some embodiments of the invention, a single SSP 100 may be defined in the storage system 10 or a plurality of SSPs 100 may be defined within a single storage system 10, for example, within a distributed storage system. According to further embodiments of the invention, the SSP management module 110 may be adapted to provide a threshold for each of a plurality of SSPs 100 defined in the system 10, and with respect to each SSP 100 may be adapted to trigger an action that is effective for managing the SSP 100 in response to the amount of storage resources used for storing snapshots in the pool 100 crossing the threshold provided for the SSP 100. According to yet further embodiments of the invention, the threshold implemented by the SSP management module 110 with respect to a SSP may be sensitive to parameters associated with a second SSP (and possibly with further SSPs). For example, a threshold implemented by the SSP management module 110 with respect to a first SSP may be sensitive to the ratio between the current amount of storage resources used for storing data in a second SSP and the total amount of storage resources allocated for the second SSP. A distributed data storage system in which a plurality of SSPs are defined is shown in and described below with reference to FIG. 2.

According to some embodiments of the invention, the SSP management module 110 may be adapted to obtain data with respect to the current amount of storage resources used for storing snapshots in a SSP 100. According to further embodiments of the invention, the data with respect to the current amount of storage resources used for storing snapshots in the SSP 100 may be obtained from any available source, or according to still further embodiments of the invention, the data with respect to the current amount of storage resources used for storing snapshots in the SSP 100 may be generated by the SSP management module 110 for each of the SSPs it is responsible for managing. For example, according to some embodiments of the invention, the SSP management module 110 may be adapted to record data with respect to data write operations in connection with a SSP 100. A data write operation may include, for example, any writing of data into a data storage device 40 or into a portion of a data storage device 40 that belongs to a storage unit with which the SSP 100 is associated. The SSP management module 110 may include a storage medium (not shown) for enabling the SSP management module 110 to record data with respect to data write operations in connection with the SSP 100. However, the SSP management module 110 may store the data elsewhere. In case the SSP management module 110 is used to manage a plurality of SSPs, the SSP management module 110 may be adapted to record each data write operation in connection with each SSP 100 separately or with reference to the SSP 100 with which the write operation is associated. According to some embodiments of the invention, the SSP management module 110 may record for each data write operation in connection with a SSP 100 at least the amount of storage resources used for writing the data, and data with respect to where the data is stored.

Thus, according to some embodiments of the invention, based on the records with respect to the write operations in connection with a SSP 100, the SSP management module 110 may be adapted to determine the ratio between a current amount of storage resources used for storing snapshots in the SSP 100 and a total storage capacity defined for the SSP 100 and to compare the ratio against the predefined threshold. According to some embodiments of the invention, the SSP management module 110 may be configured to calculate the ratio with respect to a (certain) SSP 100 and to compare it against the threshold provided for that SSP 100 whenever data is written into the SSP 100. However, some embodiments of the invention are not limited in this respect, and the SSP management module 110 may be configured to calculate the ratio with respect to a (certain) SSP 100 and to compare it against the threshold provided for that SSP 100 in response to other events, for example, after a predefined number of write operations into the SSP 100, or the SSP management module 110 may be configured to calculate the ratio with respect to a (certain) SSP 100 and to compare it against the threshold provided for that SSP 100 periodically, for example, after predefined time intervals.

As mentioned above, according to some embodiments of the invention, the action may include a deletion of data corresponding to existing snapshots from the SSP 100. According to some embodiments of the invention, as part of deleting data corresponding to existing snapshots from the SSP 100, the SSP management module 110 may be adapted to obtain data with respect to the location, for example, on the data storage device(s) 40, of data corresponding to a snapshot that is to be deleted. According to some embodiments of the invention, the SSP management module 110 may be adapted to interface with the main configuration file 18 and/or with the local configuration files 17 associated with each disk control module 106 to enable the SSP management module 110 to perform the actions discussed herein with respect to the SSP 100 and/or to obtain any necessary data in connection therewith. Once the data with respect to the location of data corresponding to the snapshot is obtained, the SSP management module 110 may be configured to delete from the storage device(s) 40 the data corresponding to the snapshot. If necessary, the storage system management module 19 and the main configuration file 18 may be utilized by the SSP management module 110 to enable the identification of the data to be deleted and to further enable the deletion thereof.

According to further embodiments of the invention, the predefined action may include an allocation of additional storage resources from a reserve storage pool 101 of the data storage system to the SSP 100. According to some embodiments of the invention, the SSP management module 110 may be adapted to cause storage resources previously allocated to a reserve storage pool 101 to be reallocated to a receiving SSP 100. For example, the SSP management module 110 may be adapted to cause the reallocation of the storage resources to the receiving SSP 100 in cooperation with the storage system management module 19. According to further embodiments of the invention the SSP management module 110, for example in cooperation with the storage system management module 19 may be adapted to modify the data in the main configuration file 18 to reflect the reallocation of the storage resource previously associated with a reserve storage pool 101 to the receiving SSP 100.

According to still further embodiments of the invention, the predefined action may include transferring storage resources previously associated with a second snapshot storage pool (not shown in FIG. 1) to the snapshot storage pool 100. For example, according to some embodiments of the invention, the SSP management module 110 may be configured to modify, for example in cooperation with the storage system management module 19, the data in the main configuration file 18 such that storage resources previously associated with a second SSP are transferred to the SSP 100.

Those of ordinary skill in the art may appreciate that according to some embodiments of the invention, the SSP management module 110 may be adapted to take any further measures as may be necessary to perform any of the aforementioned actions.

According to some embodiments of the invention, the management node 25, and in particular, the SSP management module 110 may interact with the data storage devices 40 through a disk control module 106. The disk control module 106 may be adapted to manage various aspects of the operation of the data storage devices 40, including interfacing and managing the interaction of the management node 25 and the SSP management module 110 with the data storage devices 40. According to some embodiments of the invention, the disk control module 106 may be adapted to generate and relay read and write tasks to the data storage devices 40 with which it is associated. In FIG. 1, and according to some embodiments of the invention, the disk control module 106 may be implemented as part of a cache 11. However, further embodiments of the invention are not limited in this respect, and the disk controller 106 may be otherwise implemented in the storage system. The communication module 104 may be provided to enable communication between the disk control module 106 and other components of the data storage system, and to enable communication between the disk control module 106 and other devices exterior to the data storage system, for example, with hosts.

It would be appreciated that some embodiments of the invention are not limited to being implemented as part of a distributed storage system. Rather, some embodiments of the invention may be implemented as part of any presently known or yet to be devised in the future storage system. Those of ordinary skill in the art may readily devise further implementations of some embodiments of the invention, for example, as part of various other storage systems. Furthermore, it should be noted that according to some embodiments of the invention, the SSP management module is not limited to being implemented as part of a management node of storage system, nor is it limited to being implemented as part of any other element of a storage system. According to further embodiments of the invention, the SSP may not be limited to being associated with and utilizing a cache for interfacing with the SSP, and it may use other elements of the storage system or it may be adapted to interact directly with the storage device to perform the actions described herein.

Figure 2:
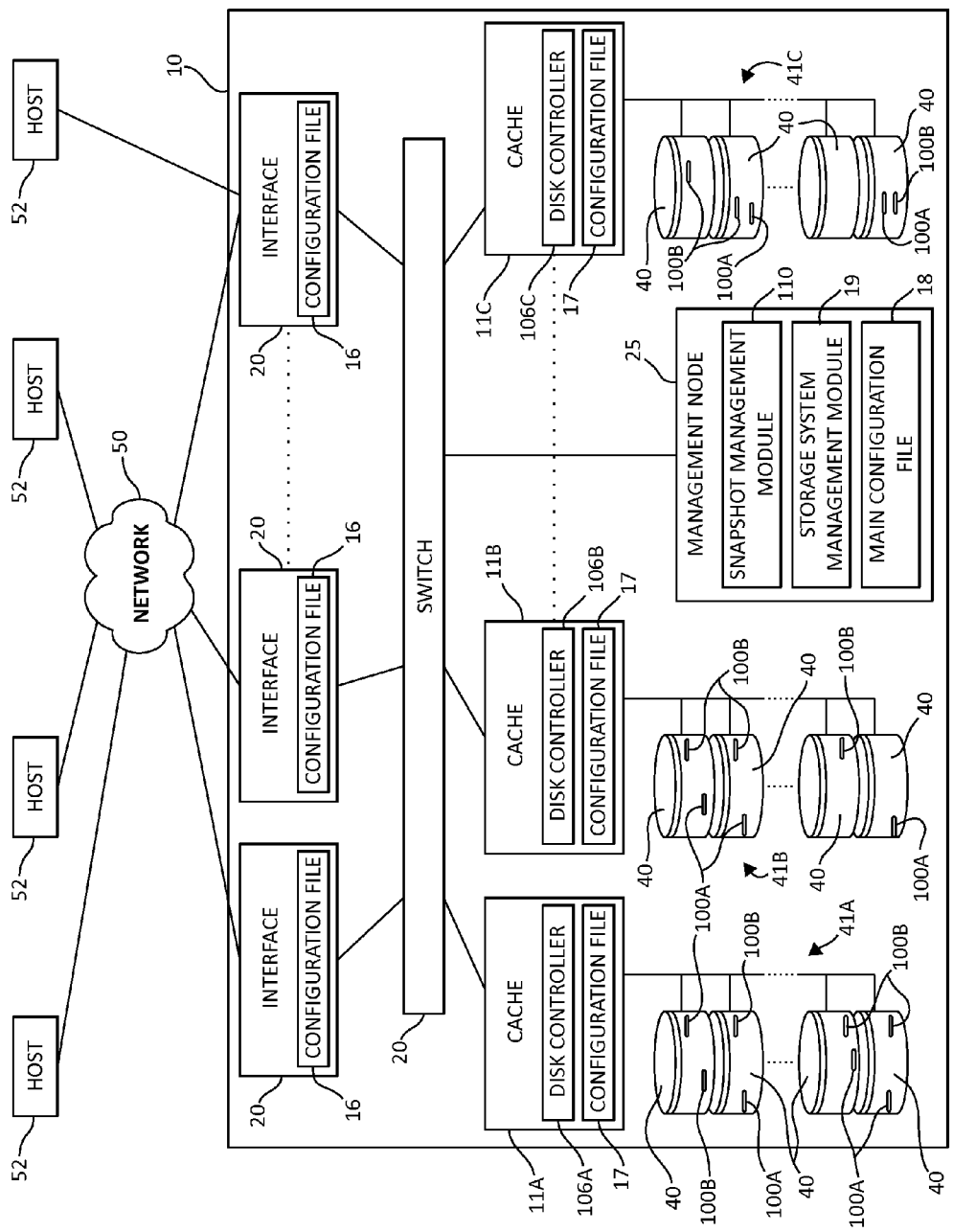
FIG. 2 is a block diagram illustration of one example of a distributed data storage system including an apparatus for managing a snapshot storage pool, according to some embodiments of the invention.

Reference is now made to FIG. 2, which is a block diagram illustration of one example of a distributed data storage system including an apparatus for managing a snapshot storage pool, according to some embodiments of the invention. According to some embodiments of the invention, an as is shown in FIG. 2, an apparatus for managing a snapshot storage pool may be implemented as a SSP management module 110 and may be incorporated within a storage system management node 25. The storage system management node 25 may further include a storage system management module 19. The storage system management module 19 may be adapted to determine and provide the configuration of the data storage system 10. The management node 25 may be adapted to define, for example, storage units 41A, 41B and 41C in the distributed storage system 10 and may determine the relationship between the physical data storage devices 40 and the virtual storage units 41A-41C. The data with respect to the configuration of the distributed data storage system 10, and specifically, with respect to the relationship between the storage devices 40 and the virtual storage units 41A-41C, may be kept at a main configuration file 18. The main configuration file 18 may be stored on the management node 25.

According to some embodiments of the invention, the SSP management module 110 may be adapted to define for each storage unit or for each group of storage units a SSP 100A and 100B and may provide, for example, in cooperation with the storage system management module 19, storage resources on the physical data storage devices 40 for storing data associated with the SSP. According to some embodiments of the invention, each of the SSPs 100A and 100B may be associated with a certain storage unit, for example with a certain logical unit or in accordance with another example, with a certain volume, and/or each of the SSPs 100A and 100B may be associated with a certain group of storage units. It would be appreciated that groups of storage units may sometimes be referred to in the context of snapshots as a "consistency group."

In FIG. 2, and according to some embodiments of the invention, the SSPs 100A and 100B may be distributed over the physical data storage devices 40. According to some embodiments of the invention, the distribution of the SSPs 100A and 100B over the physical storage device 40, and the management thereof, may be performed in accordance with a storage system management algorithm implemented by the storage system management module 19 and/or in accordance with an SSP management algorithm implemented by the SSP management module 110, for example. In accordance with another embodiment of the invention, each storage unit may be associated with specific physical storage device(s) 40, and the SSPs defined for a certain storage unit(s) may be assigned with storage resources on the specific physical storage device(s) 40 associated with the specific storage unit(s). For example, for a group of storage units including storage units 41A and 41B a first SSP 110A may be defined, and for storage unit 41C a second SSP 100B is defined.

According to some embodiments of the invention, the storage resources allocated for the SSPs 100A and 100B may be registered, for example, within and as part of the main configuration file 18. Thus, changes made with respect to the storage resource allocated for the SSPs 100A and 100B may be reflected in the main configuration file 18 and the main configuration file 18 may be modified accordingly. However, according to further embodiments of the invention, data with respect to the storage resources allocated for the SSPs 100A and 100B may be registered elsewhere either in addition to being registered within the main configuration file 18 or as an alternative.

In FIG. 2 and according to some embodiments of the invention, the SSP management module 110 may be adapted to provide for each of the first and the second SSPs 100A and 100B a threshold corresponding to a ratio between a current amount of storage resources used for storing snapshots in each of the first and the second SSPs 100A and 100B and a total storage capacity defined for each of the first and the second SSPs 100A and 100B, and may be adapted to trigger an action that is effective for managing the first or the second SSPs 100A or 100B in response to the amount of storage resources used for storing snapshots in the first or the second SSP 100A or 100B crossing the respective threshold. According to some embodiments of the invention, the total storage capacity defined for a SSP 100A and 100B may be determined by the SSP management module 110, for example, in cooperation with the storage system management module 19. According to some embodiments of the invention, with respect to each SSP 100A and 100B, the SSP management module 110 may be adapted to trigger an action that is effective for managing the SSP 100A and 100B in response to the amount of storage resources used for storing snapshots in the SSP 100A and 100B crossing the threshold provided for the SSP 100A and 100B. According to yet further embodiments of the invention, the threshold implemented by the SSP management module 110 with respect, for example, to a first SSP 100A may be sensitive to parameters associated with a second SSP 100B, and vice-versa. For example, a threshold implemented by the SSP management module 110 with respect to the first SSP 100A may be sensitive to the ratio between the current amount of storage resources used for storing data in the second SSP 100B and the total amount of storage resources allocated for the second SSP 100B.

In FIG. 2, and according to some embodiments of the invention, the SSP management module 110 may be adapted to record each data write operation in connection with each of the first and the second SSPs 100A and 100B separately or with reference to the SSP 100A and 100B with which the write operation is associated. According to some embodiments of the invention, the SSP management module 110 may record for each data write operation in connection with a SSP 100A and 100B at least the amount of storage resources used for writing the data, and data with respect to the location where the data is stored.

Various aspects of the invention which are applicable to the management of SSPs 100A and 100B have been discussed above. Provided below is an example of a scenario which illustrates certain aspects of the operation of some embodiments of the SSP management module 110. According to some embodiments of the invention, the SSP management module 110 may be adapted to transfer storage resources from the second SSP 100B to the first SSP 100A when it is determined that the ratio between the current amount of storage resources used for storing snapshots in the first SSP 100A and a total storage capacity defined for the first SSP 100A crosses a predefined threshold that is associated with such an action. According to further embodiments of the invention, the transfer of storage resources from the second SSP 100B to the first SSP 100A and/or the extent of the storage resources to be transferred may depend upon the ratio between the current amount of storage resources used for storing snapshots in the second SSP 100B and a total storage capacity defined for the second SSP 100B. According to yet further embodiments of the invention, as part of transferring storage resources from the second SSP 100B to the first SSP 100A, the SSP management module 110 in cooperation with the storage system management module 19 may cause the storage resources that are to be transferred to also be transferred from the storage unit(s), with which the second SSP 100B is associated, to storage unit(s) with which the receiving SSP, in this case the first SSP 100A, is associated.

In FIG. 2, and according to some embodiments of the invention, the distributed data storage system 10 may further include one or more interfaces 20, a switch 12, a plurality of disk controllers 106A-106C, here being part of cache devices 11A, 11B and 11C, and a plurality physical storage devices or permanent storage devices 40. The interface(s) 20 may be adapted to send and receive data to and from one or more hosts 52 associated with the distributed data storage system 10. The interface(s) 20 may enable the sending and receiving of data to and from the hosts 52 over a network 50, such as, but not limited to, the Internet. Each interface may include a copy of the configuration file 16 or some subset thereof. The switch 12 may be adapted to switch data from each of the interfaces 20 to each of the cache devices 11A-11C, and from each cache devices 11A-11C to each of the interfaces 20, as appropriate. The cache devices 11A-11C may be adapted to provide caching services and to utilize a disk controller 106A-106C to provide various management services in respect of the physical storage resources 40. The storage units 40A-40C may be implemented over a plurality of physical storage devices 40, such as optical and/or magnetic disks, on which data may be substantially permanently stored in the distributed data storage system 10. According to some embodiments of the invention, each of the cache devices 11A-11C may include a local configuration file 17. The local configuration file 17 at each cache 11A-11C may include only a portion of the data in the main configuration file 18, for example, the portion of data in the main configuration file 18 that relates to the resources of the storage system 10 with which the cache 11A-11C in which the configuration file 17 is implemented is associated. However, further embodiments of the invention are not limited in this respect, and accordance to further embodiments of the invention, the local configuration files 17 may include additional data, for example, the entire configuration data included in the main configuration file 18, including data with respect to system 10 resources that are not directly associated with the cache device 11A-11C on which the configuration file 17 is stored.

It would be appreciated by those of ordinary skill in the art, that some embodiments of the invention may provide various advantages, such as by being substantially unrestrictive and dynamic in terms of the amount of snapshots that can be maintained at any given time for any group of storage units (such as LUs or volumes) in the system, by allowing a dynamic designation and definition of storage units for which snapshots are to be created and stored, including the ability to create snapshot copies for snapshot storage pools. Additionally, some embodiments of the invention are advantageous in that they enable to create snapshot storage pools whose management metadata is not directly proportional in size to the intended size of the snapshot storage pool.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method for managing a plurality of storage pools of snapshots in a distributed data storage system, the method comprising the steps of:
   determining, by a processor, a ratio between a current amount of storage resources used in a first storage pool of snapshots and a total storage capacity for the first storage pool of snapshots, wherein the ratio is determined when a predetermined number of write operations has been performed on the first storage pool of snapshots and after a predetermined amount of time has passed;
   determining that the ratio is greater than a first predetermined threshold; and
   transferring storage resources that are assigned to a second storage pool of snapshots to the first storage pool of snapshots in response to determining that the ratio is greater than the first predetermined threshold.

2. The method of claim 1, further comprising the steps of:
   determining that the ratio is greater than a second predetermined threshold; and
   transferring storage resources associated with a third storage pool of snapshots to the first storage pool of snapshots in response to determining that the ratio is greater than the second predetermined threshold.

3. The method of claim 1, further comprising the step of selecting the second storage pool of snapshots based on a predefined criteria related to one of an amount of unused storage resources and when a particular snapshot was established.

4. The method of claim 3, wherein the step of selecting the second storage pool of snapshots comprises the step of determining that the second storage pool of snapshots includes a greatest amount of unused storage resources amongst the plurality of storage pools of snapshots.

5. The method of claim 3, wherein the step of selecting the second storage pool of snapshots comprises the step of determining that the second storage pool of snapshots includes a least amount of unused storage resources amongst the plurality of storage pools of snapshots.

6. The method of claim 3, wherein the step of selecting the second storage pool of snapshots comprises the step of determining that the second storage pool of snapshots included a most-recently established snapshot.

7. The method of claim 3, wherein the step of selecting the second storage pool of snapshots comprises the step of determining that the second storage pool of snapshots included a least-recently established snapshot.

8. A computer-readable memory storing instructions that, when executed by a processor, cause the processor to perform a method for managing a plurality of storage pools of snapshots in a distributed data storage system comprising the steps of:
   determining a ratio between a current amount of storage resources used in a first storage pool of snapshots and a total storage capacity for the first storage pool of snapshots, wherein the ratio is determined when a predetermined number of write operations has been performed on the first storage pool of snapshots and after a predetermined amount of time has passed;
   determining that the ratio is greater than a first predetermined threshold; and
   transferring storage resources that are assigned to a second storage pool of snapshots to the first storage pool of snapshots in response to determining that the ratio is greater than the first predetermined threshold.

9. The computer-readable memory of claim 8, further comprising instructions for performing the steps of:
   determining that the ratio is greater than a second predetermined threshold; and
   transferring storage resources associated with a third storage pool of snapshots to the first storage pool of snapshots in response to determining that the ratio is greater than the second predetermined threshold.

10. The computer-readable storage memory of claim 9, further comprising instructions for performing the step of selecting the second storage pool of snapshots based on a predefined criteria related to one of an amount of unused storage resources and when a particular snapshot was established.

11. The computer-readable memory of claim 10, wherein the instructions for performing the step of selecting the second storage pool of snapshots comprise instructions for performing the step of determining that the second storage pool of snapshots includes a greatest amount of unused storage resources amongst the plurality of storage pools of snapshots.

12. The computer-readable memory of claim 10, wherein the instructions for performing the step of selecting the second storage pool of snapshots comprise instructions for performing the step of determining that the second storage pool of snapshots includes a least amount of unused storage resources amongst the plurality of storage pools of snapshots.

13. The computer-readable memory of claim 10, wherein the instructions for performing the step of selecting the second storage pool of snapshots comprise instructions for performing the step of determining that the second storage pool of snapshots included a most-recently established snapshot.

14. The computer-readable memory of claim 10, wherein the instructions for performing the step of selecting the second storage pool of snapshots comprise instructions for performing the step of determining that the second storage pool of snapshots included a least-recently established snapshot.

15. A system for managing a plurality of storage pools of snapshots in a distributed data storage system, comprising:
   memory associated with the plurality of storage pools of snapshots; and
   a processor in communication with the memory, the processor for:
      determining, by the processor, a ratio between a current amount of storage resources used in a first storage pool of snapshots and a total storage capacity for the first storage pool of snapshots, wherein the ratio is determined when a predetermined number of write operations has been performed on the first storage pool of snapshots and after a predetermined amount of time has passed;
      determining that the ratio is greater than a first predetermined threshold; and
      transferring storage resources that are assigned to a second storage pool of snapshots to the first storage pool of snapshots in response to determining that the ratio is greater than the first predetermined threshold.

16. The system of claim 15, the processor further for:
determining that the ratio is greater than a second predetermined threshold; and
transferring storage resources associated with a third storage pool of snapshots to the first storage pool of snapshots in response to determining that the ratio is greater than the second predetermined threshold.

17. The system of claim 16, wherein the processor is further for selecting the second storage pool of snapshots based on a predefined criteria related to one of an amount of unused storage resources and when a particular snapshot was established.

18. The system of claim 17, wherein the processor is further for determining that the second storage pool of snapshots includes a greatest amount of unused storage resources amongst the plurality of storage pools of snapshots in selecting the second storage pool of snapshots.

19. The system of claim 17, wherein the processor is further for determining that the second storage pool of snapshots includes a least amount of unused storage resources amongst the plurality of storage pools of snapshots in selecting the second storage pool of snapshots.

20. The system of claim 17, wherein the processor is further for determining that the second storage pool of snapshots included a most-recently established snapshot or a least-recently established snapshot in selecting the second storage pool of snapshots.

* * * * *